United States Patent [19]
Ullisperger

[11] Patent Number: 5,380,188
[45] Date of Patent: Jan. 10, 1995

[54] NEEDLE SHUT-OFF NOZZLE FOR PLASTIC INJECTION MOULDING COMPOUNDS

[76] Inventor: Edmund Ullisperger, Sophienhöhe 3, D 50171 Kerpen, Germany

[21] Appl. No.: 87,878
[22] Filed: Jul. 9, 1993
[30] Foreign Application Priority Data
Jul. 9, 1992 [DE] Germany .............. 4222510
[51] Int. Cl.⁶ .............................................. B29C 45/23
[52] U.S. Cl. .............................. 425/563; 425/564
[58] Field of Search ............ 425/563, 564, 565, 566, 425/562

[56] References Cited
U.S. PATENT DOCUMENTS

| | | | |
|---|---|---|---|
| 3,295,169 | 1/1967 | Moslo | 425/563 |
| 3,933,312 | 1/1976 | Fries | 425/564 |
| 3,954,209 | 5/1976 | Ramond | 425/563 |
| 4,010,903 | 3/1977 | Sakuri et al. | 425/563 |
| 4,427,361 | 1/1984 | Saito | 425/563 |
| 4,681,528 | 7/1987 | Maruyama et al. | 425/564 |
| 4,990,083 | 2/1991 | Bernhardt | 425/564 |
| 5,049,062 | 9/1991 | Gellert | 425/563 |
| 5,059,113 | 10/1991 | Ito et al. | 425/564 |

*Primary Examiner*—Tim Heitbrink
*Attorney, Agent, or Firm*—Diller, Ramik & Wight

[57] ABSTRACT

A needle shut-off nozzle for plastic injection moulding compounds with an internal chamber for a spring acting on a shut-off nozzle has a basic body. The end of the shut-off needle (11) facing the spring (7) is designed as a cylinder (12) which is closed on the end facing the tip of the needle. The cylinder (12) engages an opposing cylinder (13), designed as a hollow cylinder, in sliding fashion, producing a sealing effect.

19 Claims, 2 Drawing Sheets

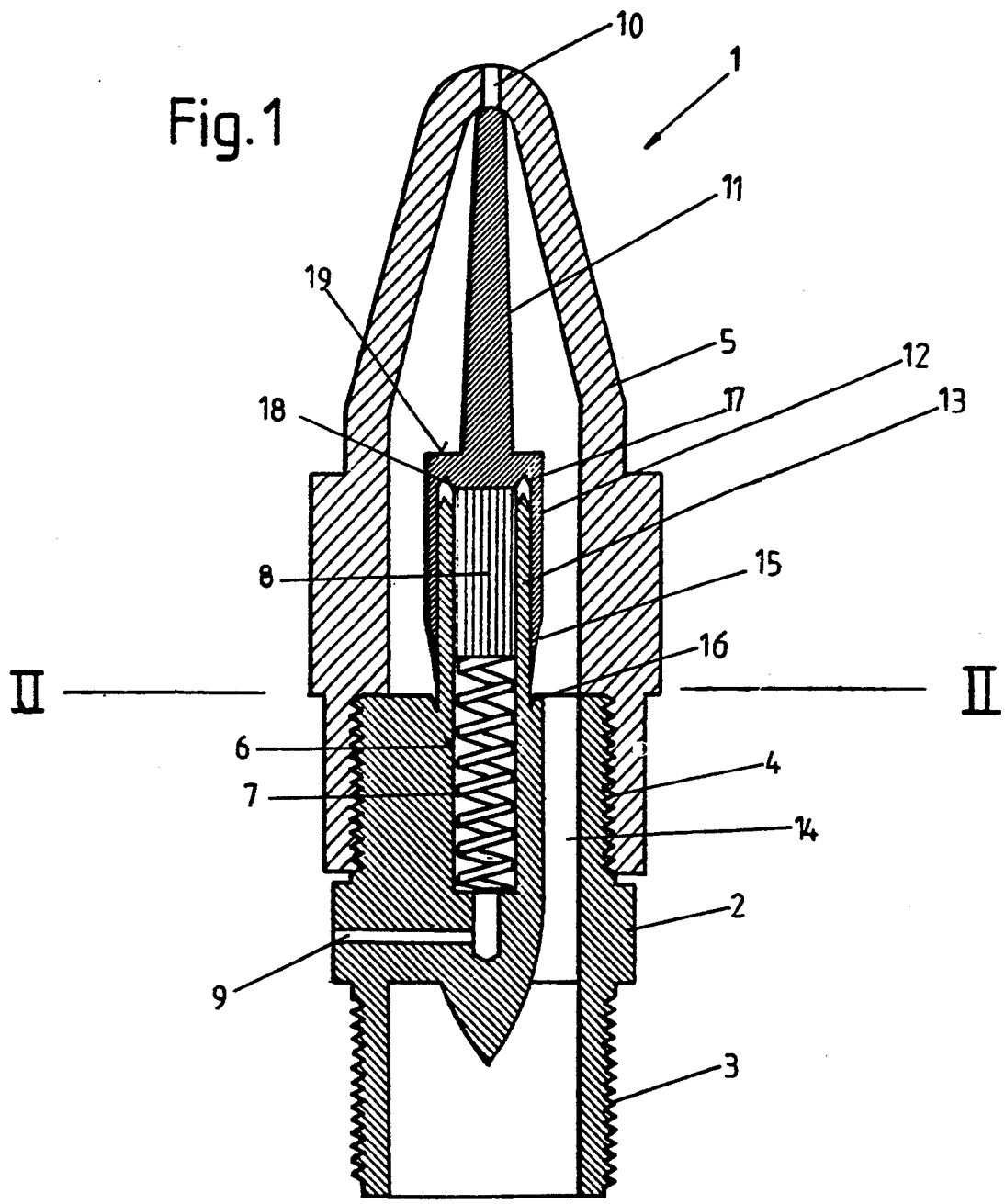

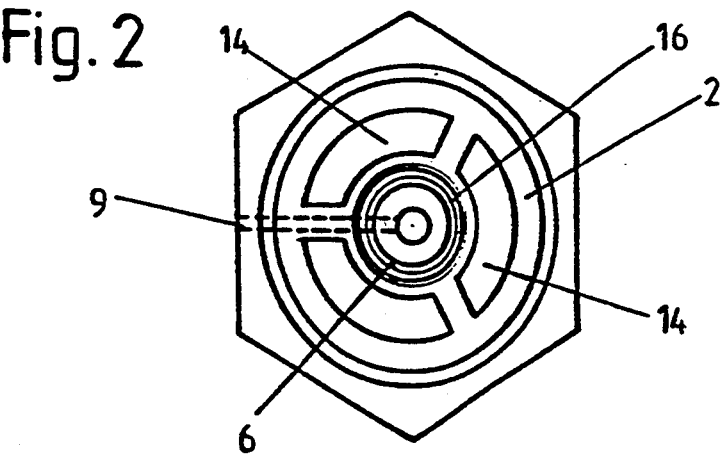

NEEDLE SHUT-OFF NOZZLE FOR PLASTIC INJECTION MOULDING COMPOUNDS

BACKGROUND OF THE INVENTION

The invention relates to a needle shut-off nozzle for plastic injection moulding compounds with an internal chamber with a spring acting on a shut-off needle in a basic body.

Injection moulding machines for thermoplastic materials, in particular for plastics, principally consist of two components, these being the clamping unit, with which the injection mould is closed and opened, and the injection unit, comprising a heatable injection cylinder, in which the injection moulding compound (plastic) is plasticated and injected into the injection mould via a suitable injection nozzle by means of a pressurisable plunger which moves in the cylinder.

The viscosity of the liquefied plastics varies. Viscous plastics with low melting points can be injected into the mould via simple, so-called open-channel nozzles, i.e. via nozzles through which the injection moulding compound can be injected into the injection mould without resistance. In the case of injection moulding compounds whose melting temperature is very high, as with polyamides, for example, the melt is of low viscosity and escapes as soon as the injection cylinder is raised from the injection mould during the injection cycle.

In order to be able to process plastic melts of low viscosity, shut-off nozzles were designed which only permit passage of the plastic melt during the injection procedure, which takes place under high injection pressure, while escape of the melt from the nozzle is prevented when the injection cylinder is lifted off the mould. The outlet, normally a hole drilled in the tip of the nozzle, is sealed on the inside of the nozzle by a shut-off needle which, in turn, is under spring pressure in a cylindrical, pressure-tight guide. In a different design, the pressure on the shut-off needle is exerted hydraulically or pneumatically via levers located outside the nozzle.

The nozzles designed to date have the disadvantage that the guide of the shut-off needle becomes worn after extended usage. Consequently, plastic melt emerges through the guide of the needle plunger, so-called leakage, which can lead to undesired contamination of the injection moulding machine, material loss and, in extreme cases, pressure loss. In the case of shut-off needles with an internal pressure spring, in particular when disk springs are used, the spring chamber gradually fills with plastic, which forms a crust and can, in particular when disk springs are used, eliminate the effect of the spring. The result of this is an increasingly frequent need to dismantle the shut-off nozzle and clean the spring chamber, this entailing a corresponding machine stoppage. For this reason, large leakage holes have been provided on needle shut-off nozzles with internal spring chamber for some time.

SUMMARY OF THE INVENTION

Thus, the task of the present invention is to further develop a needle shut-off nozzle for plastic injection moulding compounds with an internal chamber with a spring acting on a shut-off needle in a basic body in such a way that the occurrence of leakage is avoided.

By using such a design of the needle shut-off nozzle, an extraordinarily tight sealing effect is achieved when guiding the shut-off needle within the nozzle head. Leakage can no longer occur on the shut-off nozzle. Guiding of the shut-off needle and its guiding element remains faultless during the use and operation of the needle shut-off nozzle, whereby the original sealing effect is maintained. The possibility of leakage does not arise.

In accordance with a further configuration of the invention, the opposing cylinder in the basic body is designed as a spring chamber, where the spring acts on the shut-off needle. An intermediate plunger may be included in this context. The plunger, manufactured to seal tightly, transfers the pressure from the springs, preferably disk springs, onto the element which closes the outlet, i.e. the shut-off needle.

The shut-off nozzle preferably consists of a basic body, which bears, on one side, the thread for mounting the body of the nozzle on the injection cylinder and, on the opposite side, the thread for the replaceable nozzle heads. The depth of the hollow cylinder and the height of the opposing cylinder of the basic body are expediently identical. Thus, in addition to the cylindrical sealing surface, two further annular sealing surfaces are created between the hollow cylinder and the spring chamber, which become effective as soon as the hollow cylinder is pushed back by the injection pressure.

The sealing effect of the hollow cylinder can be increased by it being compressed by the injection pressure. A further sealing effect can be achieved by the face of the hollow cylinder 13 of the basic body 2 being tapered and the bottom surface 18 of the closed cylinder 12 being provided with a groove 18 corresponding to the tapered face of the hollow cylinder 13. Further sealing can be achieved by the shut-off needle 11 being provided with an annular surface 19 as a pressure surface, through which the shut-off needle 11 can be pushed back by the injection pressure so as to clear the nozzle outlet.

Needle shut-off nozzles of the type described above can also be operated with external hydropneumatic pressure elements, instead of the spring pressure elements. The spring chamber 6 is expediently fitted with a venting bore 9.

BRIEF DESCRIPTION OF THE DRAWINGS

A practical example of the invention is explained below:

FIG. 1 shows a longitudinal section of a version of the needle shut-off nozzle,

FIG. 2 is a section along line II—II in FIG. 1.

DESCRIPTION OF THE PREFERRED EMBODIMENTS

The needle shut-off nozzle 1 has a basic body 2, which is fitted with a thread 3 at one end for mounting on an injection cylinder and a thread 4 at the other end for a replaceable nozzle head. The nozzle body 2 is provided with a spring chamber 6, in which a spring 7 and a pressure plunger 8 are located.

The basic body 2 is provided with a venting bore 9 for the spring chamber 6.

Disk springs can be preferably used as the springs. A nozzle or nozzle body 5 is provided with a nozzle outlet 10 which is kept sealed by the shut-off needle. In order to guide the shut-off needle, the needle 11 is fitted with a cylinder 12, which is closed on the end facing towards the tip of the needle and which engages an opposing cylinder 13 in a gliding and sealing fashion. The opposing cylinder 13 is designed as a hollow cylinder and is located on the basic body 2, with the cylinders 12 and 13 engaging in a gliding and sealing fashion.

The lower part of the cylinder 12 of the shut-off needle 11 is bevelled at 15, specifically on the outer surface of the cylinder 12. The resultant narrow rim of the cylinder 12 can slide into a corresponding turned groove 16 in the basic body 12, whereby a further sealing effect is achieved. In order to achieve even better sealing, the upper edge of the opposing cylinder 13 can likewise be provided with a bevel or edge 17, preferably roof-shaped, with the bottom surface of an inner side of the cylinder 12 being given a corresponding, tapered turned groove 18. Thus, the upper edge 17 of the free-standing opposing cylinder 13 can likewise slide into the bottom of the cylinder 12 if suitably tapered. The sealing surfaces 15, 16 and 17, 18 become effective as soon as the cylinder 12 is pushed back by the injection pressure. The design offers several sealing surfaces on the guide between the shut-off needle 11 and the free-standing opposing cylinder 13 of the basic body 2. The numeral 19 designates an annular surface as a pressure surface, through which the injection pressure pushes back the needle, resulting in the nozzle outlet being cleared to the extent that the injection moulding compound can emerge through the nozzle outlet without frictional resistance.

Although a preferred embodiment of the invention has been specifically illustrated and described herein, it is to be understood that minor variations may be made in the apparatus without departing from the spirit and scope of the invention, as defined the appended claims.

I claim:

1. A needle shut-off nozzle for plastic injection moulding compounds comprising a body (2), a nozzle (5) having an outlet (10), means (4) for removably connecting said body (2) to said nozzle (5), said body (2) including a cylindrical portion (13) opening in a direction toward said outlet (10), a needle (11) for closing said outlet (10), said needle (11) including a cylindrical portion (12) opening in a direction away from said outlet (10) said cylindrical portions (12, 13) being in telescopic sliding relationship to each other, and said body (2) and the cylindrical portion (13) thereof being an integral one-piece homogeneous construction.

2. The needle shut-off nozzle as defined in claim 1 wherein said body cylindrical portion (13) is in internal telescopic relationship to said needle cylindrical portion (12).

3. The needle shut-off nozzle as defined in claim 1 including spring means (7) for normally biasing said needle (11) in a direction to close said outlet (10).

4. The needle shut-off nozzle as defined in claim 1 including spring means (7) for normally biasing said needle (11) in a direction to close said outlet (10), and said spring means is housed within said body cylindrical portion (13).

5. The needle shut-off nozzle as defined in claim 1 including spring means (7) for normally biasing said needle (11) in a direction to close said outlet (10), and an intermediate plunger (8) disposed between said spring means (7) and said needle (11).

6. The needle shut-off nozzle as defined in claim 1 wherein said cylindrical portions (12, 13) are substantially of the same length.

7. The needle shut-off nozzle as defined in claim 1 wherein said needle cylindrical portion (12) joins with a surface having a groove (18) aligned for sealing receipt of an edge (17) of said body cylindrical portion (13).

8. The needle shut-off nozzle as defined in claim 1 wherein said needle cylindrical portion (12) joins with a surface having a groove (18) aligned for sealing receipt of an edge (17) of said body cylindrical portion (13), and said groove (18) and edge (17) are complementary contoured.

9. The needle shut-off nozzle as defined in claim 1 wherein said needle (11) joins with an annular wall (19) which in turn joins with said needle cylindrical portion (12), and an annular exterior surface of said annular wall (19) is constructed and arranged in opposing relationship to pressure introduced into said nozzle (5) through said outlet (10).

10. The needle shut-off nozzle as defined in claim 1 including means (9) for venting a chamber (6) defined by said body cylindrical portion (13) to atmosphere through said body (2).

11. The needle shut-off nozzle as defined in claim 2 including spring means (7) for normally biasing said needle (11) in a direction to close said outlet (10).

12. The needle shut-off nozzle as defined in claim 2 including spring means (7) for normally biasing said needle (11) in a direction to close said outlet (10), and said spring means is housed within said body cylindrical portion (13).

13. The needle shut-off nozzle as defined in claim 2 wherein said needle cylindrical portion (12) joins with a surface having a groove (18) aligned for sealing receipt of an edge (17) of said body cylindrical portion (13).

14. The needle shut-off nozzle as defined in claim 3 wherein said needle cylindrical portion (12) joins with a surface having a groove (18) aligned for sealing receipt of an edge (17) of said body cylindrical portion (13).

15. The needle shut-off nozzle as defined in claim 11 wherein said cylindrical portions (12, 13) are substantially of the same length.

16. The needle shut-off nozzle as defined in claim 11 wherein said needle cylindrical portion (12) joins with a surface having a groove (18) aligned for sealing receipt of an edge (17) of said body cylindrical portion (13).

17. The needle shut-off nozzle as defined in claim 11 wherein said needle cylindrical portion (12) joins with a surface having a groove (18) aligned for sealing receipt of an edge (17) of said body cylindrical portion (13), and said groove (18) and edge (17) are complementary contoured.

18. The needle shut-off nozzle as defined in claim 11 wherein said needle (11) joins with an annular wall (19) which in turn joins with said needle cylindrical portion (12), and an annular exterior surface of said annular wall (19) is constructed and arranged in opposing relationship to pressure introduced into said nozzle (5) through said outlet (10).

19. The needle shut-off nozzle as defined in claim 11 including means (9) for venting a chamber (6) defined by said body cylindrical portion (13) to atmosphere through said body (2).

* * * * *